United States Patent [19]
Okano et al.

[11] Patent Number: 5,237,531
[45] Date of Patent: Aug. 17, 1993

[54] READ-ONLY MEMORY HAVING A SECURITY CIRCUIT PREVENTING UNAUTHORIZED MEMORY RETRIEVAL

[75] Inventors: Nobuhiro Okano, Nara; Hiroshi Uemura, Soraku, both of Japan

[73] Assignee: Sharp Kabushiki Kaisha, Osaka, Japan

[21] Appl. No.: 631,727

[22] Filed: Dec. 20, 1990

[30] Foreign Application Priority Data

Dec. 29, 1989 [JP] Japan ................................. 1-342504

[51] Int. Cl.⁵ .............................................. G06F 12/14
[52] U.S. Cl. .................................. 365/189.01; 365/94
[58] Field of Search ............................ 365/189.01, 94

[56] References Cited
U.S. PATENT DOCUMENTS 4,583,196  4/1986  Koo ..................................... 364/900
5,103,167  4/1992  Okano et al. .................. 371/22.1 X

FOREIGN PATENT DOCUMENTS 62-226335  10/1987  Japan .
62-264339  11/1987  Japan .
63-216147   9/1988  Japan .

WO83/01848   5/1983  PCT Int'l Appl. .

*Primary Examiner*—Eugene R. LaRoche
*Assistant Examiner*—Do Hyun Yoo
*Attorney, Agent, or Firm*—Nixon & Vanderhye

[57] ABSTRACT

A read-only memory provides a security circuit capable of nullifying data being output from the read-only memory itself, a memory cell array consisting of memory cells arranged in matrix, an input driver for receiving and amplifying address signals sent from a CPU, a decoder for specifying a memory cell included in the memory cell array in response to address signals sent from the input driver, and an output buffer for temporarily storing storage data of the memory cell and sending to the security circuit. The security circuit is used for inhibiting impermissible copying of memory data of the read-only memory. It serves to nullify the data read out of the read-only memory unless a memory address for specifying the data being output meets a predetermined address. That is, the security circuit can disable all of the address signals or one of the address signal when a predetermined address is accessed in the impermissible data copying operation.

13 Claims, 5 Drawing Sheets

READ-ONLY MEMORY HAVING A SECURITY CIRCUIT PREVENTING UNAUTHORIZED MEMORY RETRIEVAL

BACKGROUND OF THE INVENTION

1. Field of the Invention

The present invention relates to a read-only memory which provides a security circuit built in itself.

2. Description of the Related Art

The read-only memory is abbreviated as ROM later. Herein, the term ROM includes a Programmable ROM.

In order to prevent a program or data written in a ROM from being stolen by an adversary, a security circuit has been traditionally provided between a central processing unit (abbreviated as CPU) and the ROM. The security circuit serves to code-convert select signals sent from the CPU to the ROM such as an address signal, a chip enable signal CE, an output enable signal OE and a chip select signal CS, or to code-convert the data output read out of the ROM. The writing order of data onto the ROM is changed according to the code conversion system given by the security circuit.

The foregoing security remedy, however, needs a considerable time for designing a security circuit. When designing the system having a ROM built in itself, it further requires a designer to consider both the system and the security circuit for designing the overall program. It results in disadvantageously consuming a long time in handling the additional function such as a security circuit and more often creating defective circuit arrangement and program. Hence, more burden is given to the designer.

As another disadvantage, the overall system becomes more costly, because the addition of an additional function such as a security circuit makes the overall circuit more large-scaled, and troubles may more often take place about the circuit arrangement and program when changing the specifications of the security system.

As one remedy for solving those disadvantages, a general-purpose security integrated circuit can be considered. The content of such a security integrated circuit may be made public for a short period. Hence, the circuit has a shortcoming that it requires the system specification to be very often re-designed for security protection.

SUMMARY OF THE INVENTION

It is therefore an object of the present invention to provide a ROM provided with a security function which can be designed to reduce the developing period of a system having a ROM, lower the cost, lessen the burden given to the designer, and quickly respond to the change of specification about the system and the program.

In carrying out the object in a preferred mode, the invention provides a ROM which provides a security circuit capable of nullifying data being output from the read-only memory itself, a memory cell array consisting of memory cells arranged in matrix, an input driver for receiving and amplifying address signals sent from a CPU, a decoder for specifying a memory cell included in the memory cell array in response to address signals sent from the input driver, and an output buffer for temporarily storing storage data of the memory cell and sending to the security circuit. The security circuit is used for nullify the data read out of the read-only memory unless a memory address for specifying the data being output meets a predetermined address.

In operation, for the purpose of impermissible copying of memory data, the address is normally specified in order as starting from 0 address. Since, therefore, the address is not specified in a predetermined address, the security circuit serves to nullify the read-out data before outputting the data outside of the ROM, resulting in inhibiting impermissible copying of the memory data.

Further objects and advantages of the present invention will be apparent from the following description of the preferred embodiments of the invention as illustrated in the accompanying drawings.

DESCRIPTION OF PREFERRED EMBODIMENTS

Figure 1:
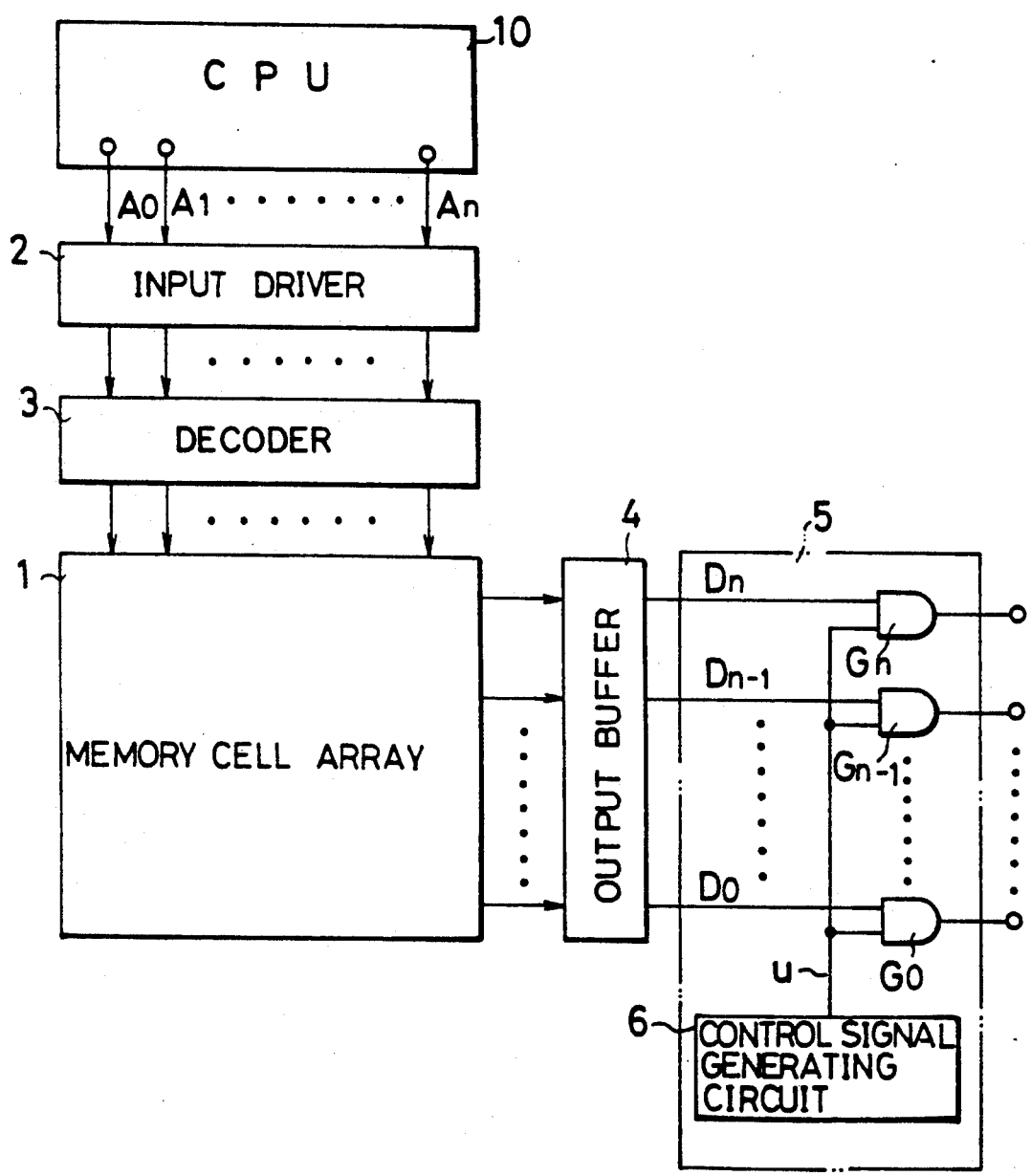
FIG. 1 is a block diagram schematically showing a ROM according to an embodiment of the invention.

FIG. 1 shows a circuit diagram showing the schematic arrangement of a ROM according to an embodiment of the invention.

1 denotes a memory cell array which is a storage area consisting of a plurality of memory cells arranged in matrix. 2 denotes an input driver which serves to amplify address signals A0 to An sent from a CPU 10.

3 denotes a decoder which has a decoding function of specifying a memory cell provided in the memory cell array 1 in accordance with the combination of the address signals A0 to An amplified by the input driver 2. The storage data contained in the specified memory cell are sent outside of the ROM through an output buffer 4 and a security circuit 5.

The security circuit 5 includes AND gates G0 to Gn respectively matching to the output terminals of the output buffer 4 and a control signal generating circuit 6. The control signal generating circuit 6 serves to nullify the data D0 to Dn output by the output buffer 4 if the address signals A0 to An do not meet a predetermined specific accessing order.

The security circuit 5 receives the data D0 to Dn output by the output buffer 4. The data D0 to Dn are given to one of two inputs of each AND gate G0 to Gn. The control signal generating circuit 6 generates and sends a control signal u to the other input of each AND gate G0 to Gn.

Figure 2:
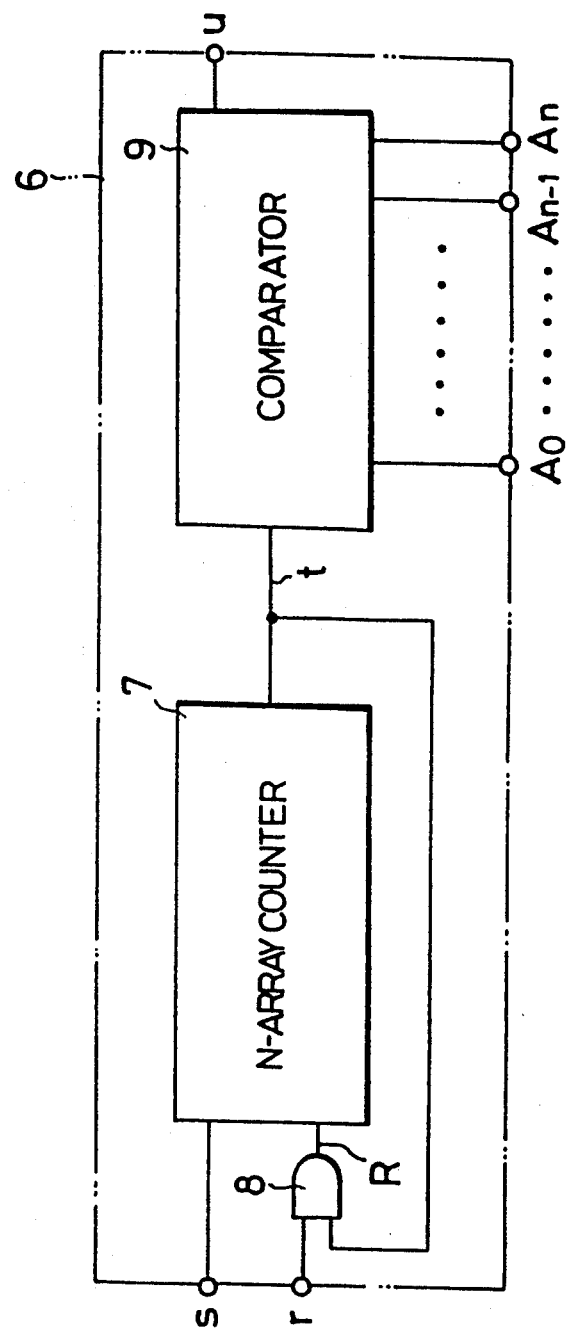
FIG. 2 is a block diagram showing an arrangement of a control signal generating circuit used in the ROM.
Figure 3:
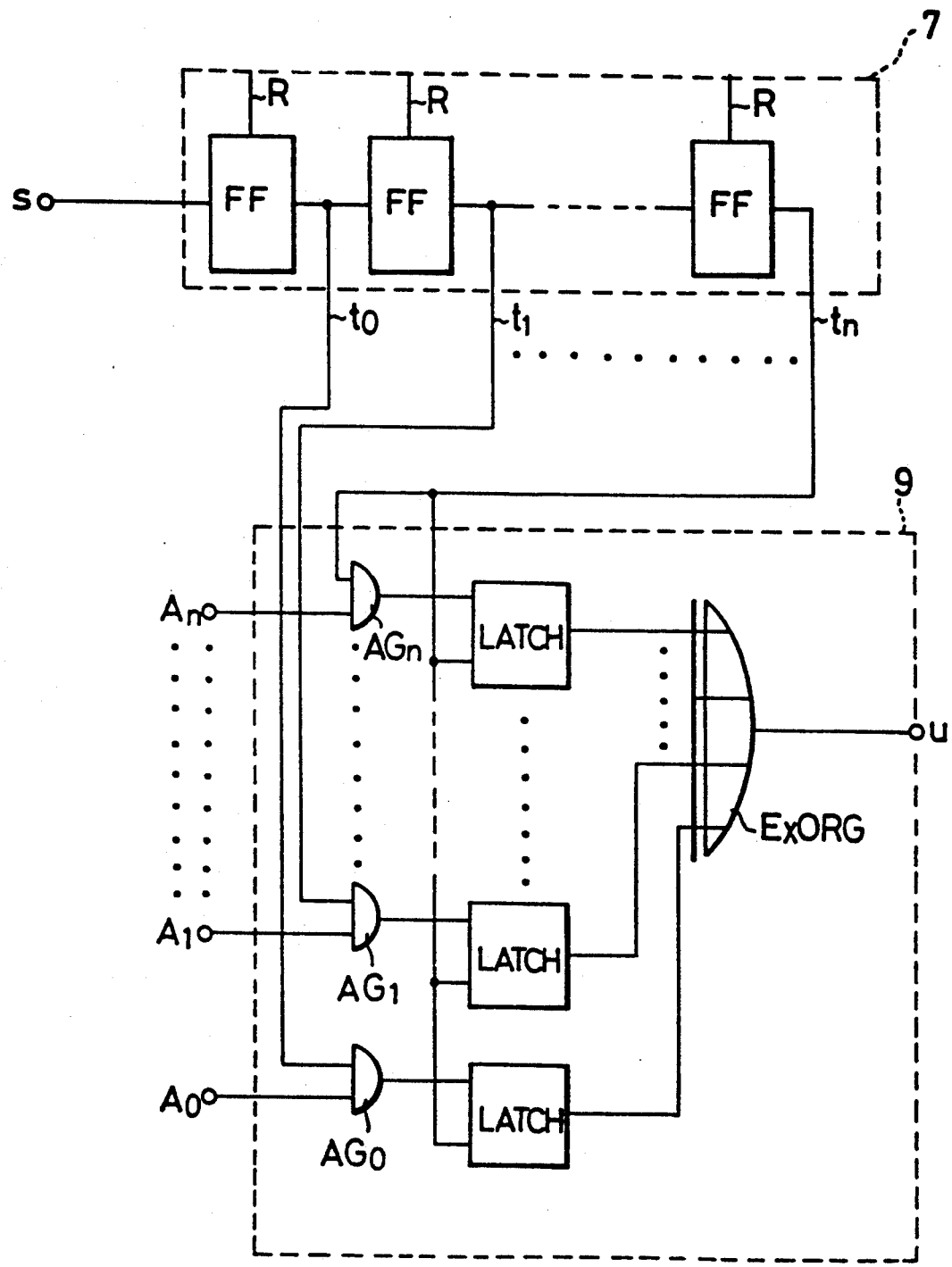
FIG. 3 is a block diagram showing a detail arrangement of an N-array counter and a comparator.

FIG. 2 shows a circuit diagram showing the arrangement of the control signal generating circuit 6 and FIG. 3 is a block diagram showing a detail arrangement of an N-array counter 7 and a comparator 9.

The control signal generating circuit 6 includes an N-array (N-digit binary) counter 7, AND gates 8 and a comparator 9. Herein, in FIG. 2, only one AND gate 8 is shown for convenience. The N-array counter 7 consists of flip-flops FF connected in a longitudinal manner as shown in FIG. 3. The N-array counter 7 receives as a count signal any select signal s such as a chip select signal CS, an output enable signal OE and a chip enable signal CE given from the CPU 10 to the ROM. The N-array counter 7 gives a count-up signal t as shown in FIG. 2 generated by the flip-flops FF to one input of each of the AND gates 8. The other input of each of the AND gates 8 receives a high-level signal r, respectively. The outputs of the AND gate 8 are given as reset signals R to the flip-flops FF. The comparator 9 includes AND gates AG0 to AGn, D-type latch circuits and Exclusive-OR gate ExORG. The N-array counter 7 gives count-up signals t0, t1, ... tn generated by each of the flip-flops FF to one input of each of the AND gates AG0 to AGn of the comparator 9, respectively. The other input of each of the AND gates AG0 to AGn receives each of the address signals A0 to An sent from the CPU 10. Each of the latch circuits receives the count-up signal tn generated by the flip-flop FF located at the final stage and the output signals from the AND gates AG0 to AGn, respectively. The output of the latch circuits are connected to the input of the Exclusive-OR gate ExORG.

In response to the count-up signals t0, t1, ... tn of the N-array counter 7, the comparator 9 compares a predetermined address with the address specified on the count-up signals t0, t1, ... tn. If these addresses coincide with each other, the comparator 9 keeps the subsequent low-level control signal u outputting from the Exclusive-OR gate ExORG. Herein, as the predetermined address, n address is selected.

For impermissible copying of the data to the ROM, how the security circuit works in the ROM will be described later.

When an adversary wants to copy the content of the ROM, he uses a proper device like a Programmable ROM writer to sequentially access the memory cell array 1 in the order of an address number as starting from a ⌈0000⌋₁₆ (a subscript 16 denotes hexadecimal notation) for reading the data written in the ROM.

Assume that the N-array counter 7 shown in FIG. 3 is a 6-array counter and the comparator 9 has as a reference address the address of ⌈0005⌋₁₆(= ⌈0000 0000 0000 0101⌋₂ (the subscript 2 denotes binary notation)).

Each time the data are read out, the control signal generating circuit 6 shown in FIG. 3 serves to count the select signal s in a one-pulse-by-one-pulse manner. When the select signal s is counted by six pulses, the N-array counter 7 serves to output a high-level count-up signals t0, t1, ... tn. The AND gates 8 change the output signals as a high-level one in response to the count-up signals. The high-level signals output by the AND gates 8 serves to reset the N-array counter 7, thereby disallowing the N-array counter 7 to count the select signal s. The N-array counter 7 thus keeps the count-up signals t0, t1, ... tn outputting.

Meanwhile, the comparator 9, which receives the count-up signals t0, t1, ... tn given by the N-array counter 7, compares the predetermined address of ⌈0005⌋₁₆ with the address specified on the count-up signals t0, t1, ... tn.

If the adversary wants to copy the data, the address specified on the count-up signals t0, t1, ... tn is equal to the predetermined address ⌈0005⌋₁₆. The coincidence of both addresses allows the control signal u output by the comparator 9 to be flipped from the high-level signal to a low-level one. The comparator 9 keeps the low-level signal outputting until the inputs of the count-up signals t0, t1, ... tn are stopped. The address comparison is done using 16-bit binary data in the comparator 9. That is, since the predetermined address ⌈A15 . . . A3 A2 A1 A0⌋₂ is the address of ⌈0000 0000 0000 0101⌋₂, it is determined whether or not both addresses coincide with each other on whether or not each bit of A2 and A0 has a value of ⌈1⌋.

The low-level control signal u output by the comparator 9 is applied to one input of each AND gate G0 to Gn matching to each output terminal of the output buffer 4. Hence, the subsequent data output through the AND gates G0 to Gn are nullified. That is, the AND gates G0 to Gn each supplies the different output from the proper data D0 to Dn output by the output buffer 4, resulting in achieving the security.

Figure 4:
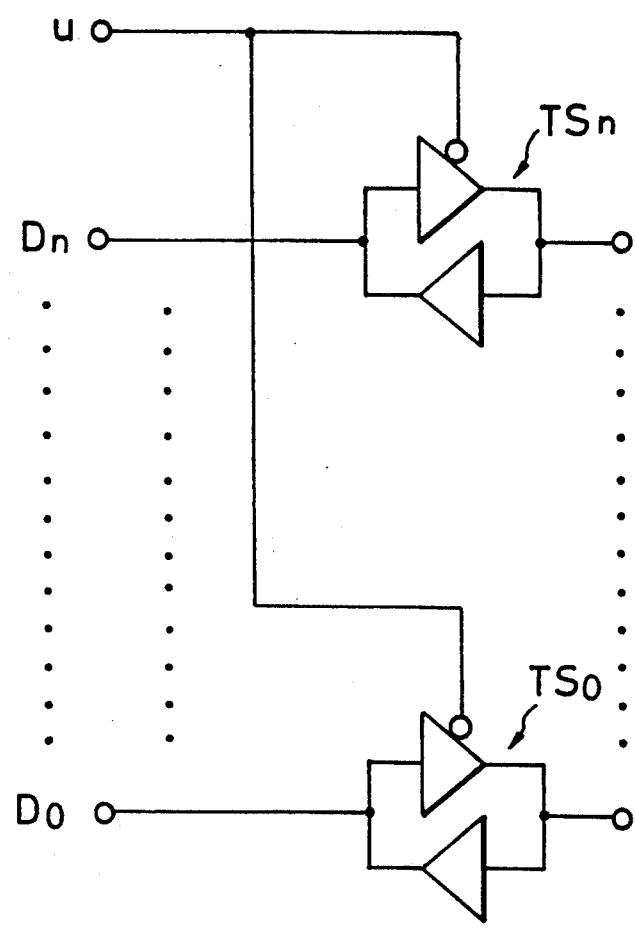
FIG. 4 is a block diagram showing another arrangement of a part of a security circuit.

FIG. 4 is a block diagram showing another arrangement of a part of the security circuit 5.

In this arrangement of the security circuit 5, the low-level control signal u output by the comparator 9 is applied to one input of each three state I/O buffer TS0 to TSn matching to each output terminal of the output buffer 4. Hence, the subsequent data output through the three state I/O buffers TS0 to TSn are nullified.

In the control signal generating circuit 6, the N-array counter 7 keeps its state being reset until the power is turned on again. It means that the outputting of nullified data is allowed to be recovered only by turning on the power again.

In the meantime, in the normal reading operation, unlike the impermissible copying of data, when the N-array counter 7 included in the security circuit 5 serves to count the select signal s by six pulses, the address specified in response to the select signal s does not coincide with the predetermined address (The count-up number of the N-array counter 7 and the address of the comparator 9 are selected so that they do not meet the address in the accessing order based on the proper operation). Hence, the control signal u output from the control signal generating circuit 6 is disallowed to be flipped to the low-level signal, thereby keeping the output data of the AND gates active.

Figure 5:
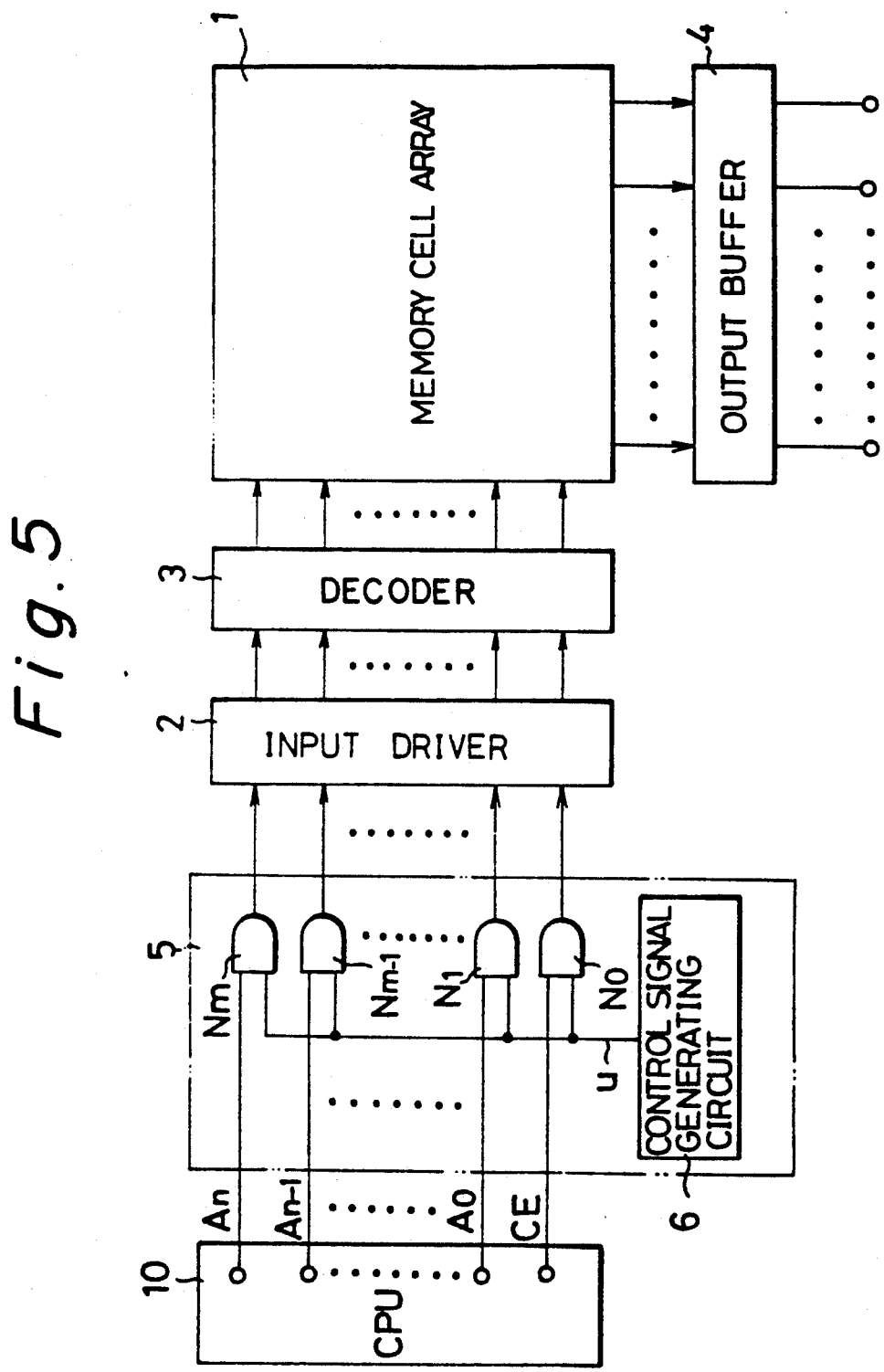
FIG. 5 is a block diagram schematically showing a ROM according to another embodiment of the invention.

FIG. 5 shows a circuit diagram showing the schematic arrangement of the ROM according to another embodiment of the invention.

The arrangement of this embodiment is substantially likewise to that of the foregoing embodiment except that the security circuit 5 is provided at a forward stage of the input driver 2. The arrangement of the security circuit 5 is equal to that described with respect to the foregoing embodiment. The security circuit 5 includes AND gates N0 to Nm and a control signal generating circuit 6. The AND gates N0 to Nm receive at one input the select signal such as address signals A0 to An, a chip enable signal CE and a chip select signal CS sent from a CPU 10. The control signal generating circuit 6 serves to generate a control signal u for nullifying those signals. The control signal u is also applied to the other input of each AND gate N0 to Nm.

In this embodiment, when a predetermined address is accessed in the impermissible data copying operation, the control signal u remains flipped from a high-level signal to a low-level one when it reaches the AND gates N0 to Nm from the control signal generating circuit 6. Hence, the AND gates N0 to Nm applies the different address signals A0 to An and select signals to the input driver 2 rather than the proper signals, resulting in nullifying the read data.

With the control signal generating circuit 6 shown in FIG. 2 and FIG. 3 described above, a user (meaning someone who manufactures the system having a ROM built therein and sells or leases it for unspecified users)

can adjustably set the reference address on which the output data are nullified like a reciting number of a cash card.

The control signal generating circuit 6 may be also designed so that the control signal u output by the control signal generating circuit 6 shown in FIG. 2 and FIG. 3 may be held by a latch circuit employing FAMOS (FAMOS: Floating gate Avalanche injection MOS) structure. With the control signal generating circuit 6 designed above, if the data-reading method is erroneously attempted (the data copying is inadvertently attempted), the ROM is disabled.

The control signal generating circuit 6 shown in FIG. 2 and FIG. 3 may be designed so that the comparator 9 is deleted and the count-up signals t0, t1, ... tn of the N-array counter 7 (which are required to be at low-level in this embodiment) are used as a control signal u. In this case, the program is created so that a specific address may be specified at the n-th access. With the program created above, the N-array counter 7 is designed not to be reset at the N-th access. It may be possible to set two or more access numbers on which the N-array counter 7 is reset.

In addition to the foregoing embodiments, another embodiment is constructed so that the data output and the address input are the select signals such as a chip enable signal CE and a chip select signal CS are modulated (for example, Exclusive-OR between both data outputs and between an address input and the select signal) with the control signal u obtained by the control signal generating circuit 6 shown in FIG. 2 and FIG. 3 for nullifying the data output.

Many widely different embodiments of the present invention may be constructed without departing from the spirit and scope of the present invention. It should be understood that the present invention is not limited to the specific embodiments described in the specification, except as defined in the appended claims.

What is claimed is:

1. A read-only memory comprising:
   a memory cell array consisting of memory cells arranged in matrix;
   an input driver for receiving and amplifying address signals sent from a CPU;
   a decoder for specifying a selected memory cell included in said memory cell array in response to address signals sent from said input driver;
   an output buffer for temporarily storing storage data of said selected memory cell before outputting the storage data; and
   a security circuit for counting a select signal sent thereto generating count-up signals based on a counted result of said select signal and for nullifying the storage data outputted from said output buffer when the address signals sent thereto coincide with the count-up signals.

2. A read-only memory according to claim 1, wherein input terminals of said security circuit are connected to output terminals of said output buffer.

3. A read-only memory according to claim 2, wherein said security circuit includes a plurality of AND gates and a control signal generating circuit, inputs of said plurality of AND gates are connected to said output terminals of said output buffer and other inputs of said plurality of AND gates are connected to receive a control signal generated by said control signal generating circuit, the control signal nullifying the storage data outputted from said output buffer.

4. A read-only memory according to claim 2, wherein said security circuit includes a plurality of three state I/O buffers and a control signal generating circuit, inputs of said plurality of three state I/O buffers are connected to said output terminals of said output buffer and other inputs of said plurality of three state I/O buffers are connected to receive a control signal generated by said control signal generating circuit, the control signal mullifying the storage data outputted from said output buffer.

5. A read-only memory according to claim 3 or 4, wherein said control signal generating circuit includes an N-array counter for generating the count-up signals and a comparator, said N-array counter sends the count-up signals to said comparator, and said comparator compares the address signals sent thereto with the count-up signals sent from said N-array counter and sends a control signal with a low level to nullify the storage data outputted from said output buffer when said address signals sent thereto coincide with the count-up signals.

6. A read-only memory according to claim 5, wherein said comparator includes a plurality of comparator AND gates and latch circuits, and an Exclusive-OR gate, inputs of said comparator AND gates receive the count-up signals, other inputs of said comparator AND gates receive said address signals sent thereto, said latch circuits receive a count-up signal from said N-array counter and output signals from said comparator AND gates, and outputs of said latch circuits are connected to inputs of said Exclusive-OR gate.

7. A read-only memory according to claim 3 or 4, wherein said security circuit includes a latch unit having a floating gate avalanche injection MOS, said latch unit holds the control signal sent from said control signal generating circuit.

8. A read-only memory comprising:
   a security circuit receiving address signals from a CPU and a select signal, counting the select signal, generating count-up signals based on a counted result of said select signal and nullifying the address signals outputted from said security circuit when the address signals coincide with the count-up signals;
   a memory cell array consisting of memory cells arranged in matrix;
   an input driver for receiving and amplifying the address signals sent from said security circuit;
   a decoder for specifying a selected memory cell included in said memory cell array in response to the address signals sent from said input driver; and
   an output buffer for temporarily storing storage data of said selected memory cell before outputting the storage data.

9. A read-only memory according to claim 8, wherein output terminals of said security circuit are connected to input terminals of said input driver.

10. A read-only memory according to claim 8, wherein said security circuit includes a plurality of AND gates and a control signal generating circuit, inputs of said plurality of AND gates receives the address signals, other inputs of said plurality of AND gates are connected to receive a control signal generated by said control signal generating circuit, the control signal nullifying the address signals outputted from said plurality of AND gates.

11. A read-only memory according to claim 10, wherein said control signal generating circuit includes an N-array counter for generating the count-up signals and a comparator, said N-array counter sends the count-up signals to said comparator, and said comparator compares the address signals sent thereto with the count-up signals sent from said N-array counter and sends the control signal with a low level to nullify the address signals outputted from said plurality of AND gates when said address signals sent thereto coincide with the count-up signals.

12. A read-only memory according to claim 11, wherein said comparator includes a plurality of comparator AND gates and latch circuits, and an Exclusive-OR gate, inputs of said comparator AND gates receive the count-up signals, other inputs of said comparator AND gates receive said address signals, said latch circuits receive a count-up signal from said N-array counter and output signals from said comparator AND gates, and outputs of said latch circuits are connected to inputs of said Exclusive-OR gate.

13. A read-only memory according to claim 11 or 12, wherein said security circuit includes a latch unit having a floating gate avalanche injection MOS, said latch unit holds the control signal sent from said control signal generating circuit.

* * * * *